United States Patent
Zhao et al.

(10) Patent No.: US 11,761,099 B2
(45) Date of Patent: *Sep. 19, 2023

(54) 3D REDUCED GRAPHENE OXIDE FOAMS EMBEDDED WITH NANOCATALYSTS, SYNTHESIZING METHODS AND APPLICATIONS OF SAME

(71) Applicant: BOARD OF TRUSTEES OF THE UNIVERSITY OF ARKANSAS, Little Rock, AR (US)

(72) Inventors: Wei Zhao, Little Rock, AR (US); Daoyuan Wang, Greensboro, NC (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/024,869

(22) Filed: Sep. 18, 2020

(65) Prior Publication Data
US 2021/0002778 A1 Jan. 7, 2021

Related U.S. Application Data

(62) Division of application No. 16/058,587, filed on Aug. 8, 2018, now Pat. No. 10,815,580.

(Continued)

(51) Int. Cl.
*B01J 23/755* (2006.01)
*B01J 27/20* (2006.01)
(Continued)

(52) U.S. Cl.
CPC .......... *C25B 11/044* (2021.01); *B01J 21/18* (2013.01); *B01J 23/745* (2013.01); *B01J 23/755* (2013.01);
(Continued)

(58) Field of Classification Search
CPC ...... B01J 23/745; B01J 23/755; B01J 23/883; B01J 21/18
See application file for complete search history.

(56) References Cited

U.S. PATENT DOCUMENTS

2013/0240439 A1* 9/2013 Pradeep ............ B01J 20/28016
428/458

FOREIGN PATENT DOCUMENTS

CN 104549363 A * 4/2015
CN 105618060 A * 6/2016 .............. B01J 21/18
(Continued)

OTHER PUBLICATIONS

Wang (One-Pot Growth of 3D Reduced Graphene Oxide Foams Embedded with NiFe Oxide Nanocatalysts for Oxygen Evolution Reaction, Journal of the Electrochemical Society, 2016, 163 (11), pp. F3158-F3163.*

(Continued)

*Primary Examiner* — Jun Li
(74) *Attorney, Agent, or Firm* — Locke Lord LLP; Tim Tingkang Xia, Esq.

(57) ABSTRACT

A method of synthesizing a three-dimensional (3D) reduced graphene oxide (RGO) foam embedded with water-splitting nanocatalysts includes providing at least one solution containing at least one precursor of nanocatalysts, and a graphene oxide (GO) aqueous suspension; mixing the GO aqueous suspension with the at least one solution to form a mixture suspension; and performing hydrothermal reaction in the mixture suspension to form a 3D RGO foam embedded with the nanocatalysts.

7 Claims, 9 Drawing Sheets

Related U.S. Application Data

(60) Provisional application No. 62/543,604, filed on Aug. 10, 2017.

(51) Int. Cl.
| | |
|---|---|
| *B01J 37/00* | (2006.01) |
| *C25B 11/044* | (2021.01) |
| *C25B 1/04* | (2021.01) |
| *B01J 23/745* | (2006.01) |
| *B01J 23/883* | (2006.01) |
| *B01J 21/18* | (2006.01) |
| *C25B 11/031* | (2021.01) |
| *C25B 11/077* | (2021.01) |

(52) U.S. Cl.
CPC .............. *B01J 23/883* (2013.01); *B01J 27/20* (2013.01); *B01J 37/00* (2013.01); *C25B 1/04* (2013.01); *C25B 11/031* (2021.01); *C25B 11/077* (2021.01)

(56) References Cited

FOREIGN PATENT DOCUMENTS

| | | | | |
|---|---|---|---|---|
| CN | 106268854 A | * | 1/2017 | |
| CN | 106654305 A | * | 5/2017 | .............. H01M 4/88 |
| CN | 106832426 A | * | 6/2017 | |

OTHER PUBLICATIONS

Machine translation of Liu et al. (CN105618060), publication date Jun. 1, 2016.*

Xu et al. (Self-Assembled Graphene Hydrogen via a One-step Hydrothermal Process, ACS Nano, vol. 4, No. 7, 4324-4330, 2010).*

Machine translation of Wang (CN106268854), publication date Jan. 4, 2017.*

Machine translation of Zhang (CN106832426A), publicadation date Jun. 13, 2017.*

Machine translation of Li et al. (CN104549363A), publication date, Apr. 2015.*

\* cited by examiner

3D REDUCED GRAPHENE OXIDE FOAMS EMBEDDED WITH NANOCATALYSTS, SYNTHESIZING METHODS AND APPLICATIONS OF SAME

CROSS-REFERENCE TO RELATED PATENT APPLICATIONS

This application is a divisional application of U.S. patent application Ser. No. 16/058,587, filed Aug. 8, 2018, now allowed, which itself claims priority to and the benefit of U.S. Provisional Patent Application Ser. No. 62/543,604, filed Aug. 10, 2017, which are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [43] represents the 43rd reference cited in the reference list, namely, Song, C. H.; Pehrsson, P. E.; Zhao, W. Recoverable Solution Reaction of HiPco Carbon Nanotubes with Hydrogen Peroxide. *J. Phys. Chem. B* 2005, 109, 21634-21639.

FIELD OF THE INVENTION

The invention relates generally to the field of materials, and more particularly, to one-pot growth of three dimensional (3D) reduced graphene oxide foams embedded with water splitting nanocatalysts for hydrogen and oxygen production, making methods and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Three dimensional (3D) porous reduced graphene oxide (RGO) foams have presented a number of interesting applications [18-23]. The 3D RGO foam structure fabricated from flexible RGO sheets forms an effective network for electron transfer, provides massive pore structures for ion transport, and results in large surface areas for reaction [19, 20]. However, previous research work for Ni—Fe oxide and MoS2 catalyst synthesis on carbon-based substrates involved multi-steps [12-16], which increases the complexity for the synthesis.

Therefore, a heretofore unaddressed need exists in the art to address the aforementioned deficiencies and inadequacies.

SUMMARY OF THE INVENTION

Active, stable, earth-abundant and cost-effective electrocatalysts are important to water splitting for producing oxygen and clean fuel hydrogen. One of the objectives of this invention is to develop a facile, one-step process to synthesize reduced graphene oxide (RGO) foam embedded with nickel-iron (Ni—Fe) oxide nanocatalysts for oxygen evolution reaction (OER) and $MoS_2$ nanocatalysts for hydrogen evolution reaction (HER).

In certain aspects, the invention relates to a facile one-pot hydrothermal assembly of three-dimensional (3D) RGO-nanocatalyst hybrid foams as effective catalysts for OER and HER, which produces low-cost, highly stable, low-overpotential, and high earth abundant electrocatalysts Ni—Fe oxide and $MoS_2$ for water splitting. Using non-precious Ni—Fe oxide nanoparticles as an example, in the one-step hydrothermal process, only in a narrow pH range, the 3D RGO foam is formed with non-precious Ni—Fe oxide nanoparticles (<5 nm) embedded in the porous structure of the foam. The as-formed 3D structured RGO foams provide an effective network for electron transfer, massive pore structures for ion transport, and large surface areas for water splitting reaction with the water splitting properties comparable to those of iridium (Ir) catalyst and other superior Ni—Fe catalysts.

In one aspect of the invention, a method of synthesizing 3D RGO foams embedded with water splitting nanocatalysts includes providing a first solution containing nickel (II) nitrate, a second solution containing iron (III) nitrate, and a graphene oxide (GO) aqueous suspension; mixing the GO aqueous suspension with the first solution and the second solution to form a GO-Ni—Fe mixture suspension; adjusting a pH value of the GO-Ni—Fe mixture suspension to be about 3.5; and performing hydrothermal reaction in the GO-Ni—Fe mixture suspension to form RGO-Ni—Fe foams, wherein nanocatalysts containing Ni—Fi oxide particles are embedded in porous structures of the 3D RGO foams.

In one embodiment, the GO-Ni—Fe mixture suspension is characterized with pH=3.5 and a molar ratio of C:Ni:Fe=14:1:0.33.

In one embodiment, the pH value of the GO-Ni—Fe mixture suspension is adjusted by adding a NaOH solution therein.

In one embodiment, the first and second solutions are provided by dissolving $Ni(NO_3)_2 \cdot 6H_2O$ and $Fe(NO_3)_3 \cdot 9H_2O$ into deionized water, respectfully.

In one embodiment, the hydrothermal reaction in the GO-Ni—Fe mixture suspension is performed in a sealed autoclave for hydrothermal reaction at a predetermined temperature for a period of time. In one embodiment, the predetermined temperature is in a ranges of about 160-200° C., and the period of time is in a range of about 7-11 h.

In one embodiment, the method further includes washing the RGO-Ni—Fe foam with deionized water.

In one embodiment, the method further includes freeze-drying the RGO-Ni—Fe foam under about 0.05 mbar vacuum at about −50° C. to obtain the RGO-Ni—Fe solid foam.

In one embodiment, the method further includes, prior to performing hydrothermal reaction in the GO-Ni—Fe mixture suspension, ultrasonicating the GO-Ni—Fe mixture suspension to remove air bubbles that are trapped in the GO-Ni—Fe mixture suspension.

In another aspect of the invention, a method of synthesizing 3D RGO foams embedded with water splitting nanocatalysts includes providing at least one solution containing at least one precursor of nanocatalysts, and a graphene oxide (GO) aqueous suspension; mixing the GO aqueous suspension with the at least one solution to form a mixture suspension; and performing hydrothermal reaction in the mixture suspension to form a 3D RGO foam embedded with the nanocatalysts.

In one embodiment, the at least one precursor comprises $Na_2MoO_4$ and L-cysteine. In one embodiment, the 3D RGO foam embedded with the nanocatalysts is a 3D RGO-$MoS_2$ foam.

In one embodiment, the mixture suspension is characterized with pH=5.8.

In one embodiment, the at least one solution comprises a first solution containing nickel (II) nitrate, and a second solution containing iron (III) nitrate. In one embodiment, the first and second solutions are formed by dissolving $Ni(NO_3)_2 \cdot 6H_2O$ and $Fe(NO_3)_3 \cdot 9H_2O$ into deionized water, respectfully.

In one embodiment, the mixture suspension is characterized with pH=3.5 and a molar ratio of C:Ni:Fe=14:1:0.33.

In one embodiment, the hydrothermal reaction in the mixture suspension is performed in a sealed autoclave for hydrothermal reaction at a predetermined temperature for a period of time. In one embodiment, the predetermined temperature is in a ranges of about 160-200° C., and the period of time is in a range of about 7-11 h.

In one embodiment, the 3D RGO foam embedded with the nanocatalysts is the RGO-Ni—Fe foam.

In one embodiment, the method further includes freeze-drying the RGO-Ni—Fe foam under about 0.05 mbar vacuum at about −50° C.

In one embodiment, the method further includes, prior to performing hydrothermal reaction in the mixture suspension, ultrasonicating the mixture suspension to remove air bubbles that are trapped in the mixture.

In yet another aspect, the invention relates to 3D RGO foams embedded with nanocatalysts, synthesized the above disclosed methods.

In a further aspect, the invention relates to a device for water splitting including a working electrode containing 3D RGO foams embedded with nanocatalysts, where the 3D RGO foams embedded with nanocatalysts are synthesized the above disclosed methods.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1A:
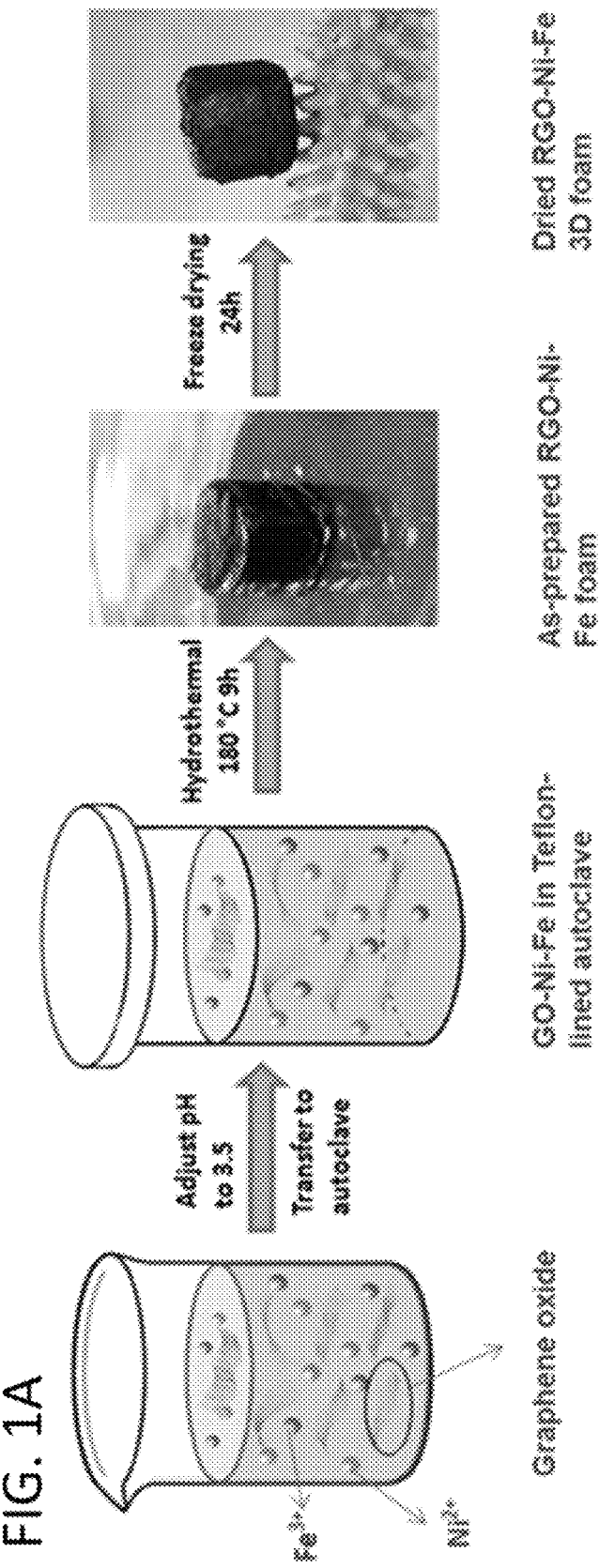
FIG. 1A shows schematically preparation of a RGO-Ni—Fe foam through a one-pot hydrothermal process, according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated. As used herein, the phrase "at least one of A, B, and C" should be construed to mean a logical (A or B or C), using a non-exclusive logical OR.

As used herein, the term "Hummers method" refers to a chemical process that can be used to generate graphite oxide through the addition of potassium permanganate to a solution of graphite, sodium nitrate, and sulfuric acid. It is commonly used by engineering and lab technicians as a reliable method of producing quantities of graphite oxide. It is also able to be revised in the creation of a one-molecule-thick version of the substance known as graphene oxide. In 1958, Hummers and Offeman reacted graphite with a mixture of $KMnO_4$ and concentrated $H_2SO_4$ and achieved similar levels of oxidation to Brodie's method (Cite ref26: Hummers, W. S.; Offeman, R. E. Preparation of Graphitic Oxide. *Journal of the American Chemical Society* 1958, 80, 1339-1339). Ever since then, the Hummers method has been widely studied and modified in many ways. Typically, the modified Hummers method involves a pre-expansion step of graphite to increase the interlayer spacing and to achieve higher degree of oxidation. For pre-expansion, graphite is first treated with a mixture of concentrated sulfuric acid ($H_2SO_4$), potassium persulfate ($K_2S_2O_8$) and phosphorus pentoxide ($P_2O_5$) at 80° C. for several hours. The pre-treated graphite is then diluted, filtered, washed, dried, and oxidized using a mixture of concentrated sulfuric acid, sodium nitrate ($NaNO_3$) and potassium permanganate ($KMnO_4$) at 45° C. for 2 h. The GO produced by this method contains up to 26 wt % oxygen. The oxidation degree and product yield have been greatly improved. In 2010, Tour and coworkers developed a more convenient and effective method, known as improved Hummers method (Cite ref31: Marcano, D. C.; Kosynkin, D. V.; Berlin, J. M.; Sinitskii, A.; Sun, Z.; Slesarev, A.; Alemany, L. B.; Lu, W.; Tour, J. M. Improved Synthesis of Graphene Oxide. *ACS Nano* 2010, 4, 4806-4814) to improve the degree of oxidation of GO, minimize the evolution of toxic gases during oxidation, and to get large-area GO sheets. In this synthesis protocol, sodium nitrate ($NaNO_3$) is replaced by six equivalents of potassium permanganate ($KMnO_4$). Additionally, the reaction mixture consists of a 9:1 mixture of concentrated sulfuric acid ($H_2SO_4$) and phosphoric acid ($H_3PO_4$). One of the advantages of this invebtion is the absence of $NaNO_3$, thus no generation of toxic gases such as $NO_2$, and $N_2O_4$ in the reaction, and making it more environmentally friendly.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

The world demands sustainable and renewable energy to counteract the climate change related to the $CO_2$ emission from fossil fuels [1, 2]. Hydrogen production from water splitting with renewable power sources, considered as one of the most efficient ways to produce such energy at low cost and high purity, has attracted increasing attention [3-9]. In the water splitting process, water molecules are reacted to form molecular hydrogen and molecular oxygen. The splitting of water can be written as two half reactions. At the cathode, protons are reduced to hydrogen (hydrogen evolution reaction, HER), in acidic solution $2H^+ + 2\ e^- \rightarrow H_2$, and $2H_2O + 2e^- \rightarrow 2OH^- + H_2$ in basic solution. At the anode, water is oxidized to oxygen (oxygen evolution reaction, OER). In acidic solution, OER involves four proton-coupled electron transfers and oxygen-oxygen bond formation, $2H_2O \rightarrow O_2 + 4H^+ + 4e^-$, and in alkaline solution, four hydroxyl groups ($OH^-$) were transformed into $H_2O$ molecules and $O_2$ molecule with four electrons involved, $4OH^- \rightarrow O_2 + 2H_2O + 4e^-$ [4, 8-10]. OER usually requires an overpotential in substantial excess of its thermodynamic potential (1.23 V vs the reversible hydrogen electrode (RHE), at standard temperature and pressure) to deliver an acceptable current density [4, 11]. Currently best known catalysts for water splitting contain precious metals such as Pt for HER and Ir for OER [4, 12-14]. However, these materials are rare and expensive. Therefore, search for low-cost, highly stable, low-overpotential, and high earth abundant electrocatalysts for water splitting is of keen interest [4].

OER, as an important half-reaction for water splitting, has been intensely studied for many decades [4]. Among OER electrocatalysts, NiFe-based compounds have been used as active OER catalysts [4, 8, 16]. More recently, NiFe-based nanostructural materials have attracted great attention for being promising OER electrocatalysts in alkaline conditions for better activity and stability [6, 12-14, 16, 17]. Ni and Fe mixed oxides (NiFe oxides) have one of the lowest reported overpotentials for OER of about 0.20 V to obtain a current density of about 10 mA/cm$^2$ [13, 14]. More interestingly, these electrocatalytic Ni and Fe oxide-based nanomaterials possess high performance for hydrogen and oxygen evolution when synthesized on carbon nanostructures as demonstrated recently [12-14]. It has been observed that nanoscale nickel oxide/nickel heterostructures formed on carbon nanotube (CNT) sidewalls are highly effective HER electrocatalysts with activity similar to platinum by Dai's group [12]. It was noticed that the formation of NiO/Ni heterostructure relied on the oxidized CNT growth substrate. Without any CNT as support, the same reaction steps produced aggregated Ni particles in a plate-like morphology with lower HER activity than NiO/Ni-CNT, in strong contrast to the small nanoparticle structure of NiO/Ni on CNT. These results suggested that on oxidized CNTs, the reduction of oxidized Ni species during thermal decomposition was impeded or retarded likely due to pinning or interactions of Ni species with oxidized CNTs through oxygen functional groups, delaying the reduction of Ni into larger aggregates via Ostwald ripening. It was concluded that substrate-precursor interaction could profoundly affect the morphology, structure and catalytic activity of materials [12]. With the same approach, Dai's group developed nanoscale NiFe-CNT electrocatalyst that presented superior OER performance over iridium catalyst [13].

In agreement with Dai's work, it was further demonstrated by Cui's group that the catalytic activity can be dramatically improved, when transition metal oxide (iron, cobalt, nickel oxides and their mixed oxides) nanoparticles (about 20 nm) grown on carbon fiber paper (CFP) substrates are electrochemically transformed into ultra-small diameter (2-5 nm) nanoparticles through lithium-induced conversion reactions. Different from most traditional chemical syntheses, this method maintains excellent electrical interconnection among nanoparticles and results in large surface areas and many catalytically active sites. More interestingly, it was found that lithium-induced ultra-small $NiFeO_x$ nanoparticles are active bifunctional catalysts exhibiting high activity and stability for overall water splitting in base, better than the combination of benchmark catalysts iridium and platinum [14].

In certain aspects, this invention focuses on a facile one-pot hydrothermal assembly of 3D RGO-nanocatalyst hybrid foams as effective catalysts for OER and HER, which produces low-cost, highly stable, low-overpotential, and high earth abundant electrocatalysts Ni—Fe oxide and $MoS_2$ for water splitting.

According to the invention, Ni—Fe oxide electro-nanocatalysts can be grown in 3D porous RGO foams that have presented a number of interesting applications [18-23]. The 3D RGO foam structure fabricated from flexible RGO sheets forms an effective network for electron transfer, provides massive pore structures for ion transport, and results in large surface areas for reaction [19, 20]. However, previous research work for Ni—Fe oxide catalyst synthesis on carbon-based substrates involved multi-steps [12-14, 16], which increases the complexity for the synthesis. To solve the problems, this invention invents a facile, one-step process to synthesize RGO foam embedded with NiFe oxide nanoparticles. In certain embodiments, RGO-Ni—Fe is used to represent RGO-$NiFeO_x$, where $NiFeO_x$ could be a mixture of NiO and $Fe_2O_3$, depending on the thermal annealing conditions [14]. First, 3D RGO foams are fabricated using graphene oxide (GO) suspensions made from the modified Hummers method (the modified Hummers GO) [24]. Then the facile one-pot hydrothermal assembly of RGO-Ni—Fe hybrid foams is obtained. The 3D RGO foams embedded with Ni—Fe oxide nanoparticles (<5 nm) were successfully prepared in one-step hydrothermal process in a narrow pH range around 3.5. One embodiment of the preparation process of RGO-Ni—Fe foams is illustrated in FIG. 1A. The RGO-Ni—Fe foams were characterized using X-ray photoelectron spectroscopy (XPS), X-ray diffraction (XRD), Raman spectroscopy, scanning electron microscopy (SEM), and transmission electron microscopy (TEM). The electrochemical properties of the RGO-Ni—Fe foams were investigated by using a three-electrode system under alkaline conditions. It was observed that the OER onset potential of the RGO-Ni—Fe sample was about 1.46 V vs. RHE, and the Tafel slope of about 57 mV/decade in 1 M KOH, comparable to those of iridium catalyst [14] and Ni—Fe nanocompounds synthesized by other groups [13, 14, 16]. As a comparison with the RGO-Ni—Fe porous foam, a RGO-Ni—Fe membrane was also prepared via vacuum filtration and annealed at about 500° C. for OER studies, which has a tightly packed layered structure [25], in contrast with the 3D porous structure of the foam.

In one aspect of the invention, a method of synthesizing 3D RGO foams embedded with water splitting nanocatalysts includes providing a first solution containing nickel (II)

nitrate, a second solution containing iron (III) nitrate, and a graphene oxide (GO) aqueous suspension; mixing the GO aqueous suspension with the first solution and the second solution to form a GO-Ni—Fe mixture; adjusting a pH value of the GO-Ni—Fe mixture to be about 3.5; and performing hydrothermal reaction in the GO-Ni—Fe mixture to form RGO-Ni—Fe foams, wherein nanocatalysts containing Ni—Fi oxide particles are embedded in porous structures of the 3D RGO foams.

In one embodiment, the GO-Ni—Fe mixture is characterized with pH=3.5 and C:Ni:Fe=14:1:0.33.

In one embodiment, the pH value of the GO-Ni—Fe mixture is adjusted by adding a NaOH solution therein.

In one embodiment, the first and second solutions are provided by dissolving Ni(NO$_3$)$_2$.6H$_2$O and Fe(NO$_3$)$_3$.9H$_2$O into deionized water, respectfully.

In one embodiment, the hydrothermal reaction in the GO-Ni—Fe mixture is performed in a sealed autoclave for hydrothermal reaction at a predetermined temperature for a period of time.

In one embodiment, the predetermined temperature is in a ranges of about 160-200° C., and the period of time is in a range of about 7-11 h.

In one embodiment, the method further includes washing the RGO-Ni—Fe foam with deionized water.

In one embodiment, the method further includes freeze-drying the RGO-Ni—Fe foam under about 0.05 mbar vacuum at about −50° C. to obtain the RGO-Ni—Fe solid foam.

In one embodiment, the method further includes, prior to performing hydrothermal reaction in the GO-Ni—Fe mixture, ultrasonicating the GO-Ni—Fe mixture to remove air bubbles that are trapped in the GO-Ni—Fe mixture.

In another aspect of the invention, a method of synthesizing 3D RGO foams embedded with water splitting nanocatalysts includes providing at least one solution containing at least one precursor of nanocatalysts, and a graphene oxide (GO) aqueous suspension; mixing the GO aqueous suspension with the at least one solution to form a mixture; and performing hydrothermal reaction in the mixture to form a 3D RGO foam embedded with the nanocatalysts.

In one embodiment, the at least one precursor comprises Na$_2$MoO$_4$ and L-cysteine. In one embodiment, the 3D RGO foam embedded with the nanocatalysts is a 3D RGO-MoS$_2$ foam.

In one embodiment, the mixture is characterized with pH=5.8.

In one embodiment, the at least one solution comprises a first solution containing nickel (II) nitrate, and a second solution containing iron (III) nitrate. In one embodiment, the first and second solutions are formed by dissolving Ni(NO$_3$)$_2$.6H$_2$O and Fe(NO$_3$)$_3$.9H$_2$O into deionized water, respectfully.

In one embodiment, the mixture is characterized with pH=3.5 and C:Ni:Fe=14:1:0.33.

In one embodiment, the hydrothermal reaction in the mixture is performed in a sealed autoclave for hydrothermal reaction at a predetermined temperature for a period of time. In one embodiment, the predetermined temperature is in a ranges of about 160-200° C., and the period of time is in a range of about 7-11 h.

In one embodiment, the 3D RGO foam embedded with the nanocatalysts is the RGO-Ni—Fe foam.

In one embodiment, the method further includes freeze-drying the RGO-Ni—Fe foam under about 0.05 mbar vacuum at about −50° C.

In one embodiment, the method further includes, prior to performing hydrothermal reaction in the mixture, ultrasonicating the mixture to remove air bubbles that are trapped in the mixture.

In yet another aspect, the invention relates to 3D RGO foams embedded with nanocatalysts, synthesized the above disclosed methods.

In a further aspect, the invention relates to a device for water splitting including a working electrode containing 3D RGO foams embedded with nanocatalysts, where the 3D RGO foams embedded with nanocatalysts are synthesized the above disclosed methods.

A facile one-pot hydrothermal assembly of 3D RGO-nanocatalyst hybrid foams as effective catalysts for oxygen evolution reaction and hydrogen evolution reaction, can find applications related to hydrogen fuel clean energy, space applications, biomedical applications, and tissue engineering.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Fabrication of RGO Foams

In this exemplary example, GO was synthesized from natural graphite using modified Hummers method [24, 26]. The concentration of prepared GO suspension solution was determined to be about 2 mg/mL. About 63 atomic % was C, as estimated by XPS. The 3D RGO foam was fabricated via a hydrothermal process [13, 18, 20, 27]. Different pH levels were systematically studied and the sturdy RGO foam was formed in a wide pH range of about 1.5-11.5 when using the GO suspension from the modified Hummers method. To be consistent with the condition for the RGO-Ni—Fe foam synthesis, the pH of the GO suspension was adjusted to about 3.5. About 10 mL of the GO suspension were transferred to a 23 mL Teflon-lined autoclave (Model No. 4749, Parr) and went through a hydrothermal reduction process at about 180° C. for about 9 h. The as-prepared RGO foam was carefully taken out of the autoclave and washed with DI water for several times. Finally, it was freeze-dried under about 0.05 mbar vacuum at about −50° C. using a freeze dryer (Labconco FreeZone 2.5).

Fabrication of RGO-Ni—Fe Foams

Figure 1B:
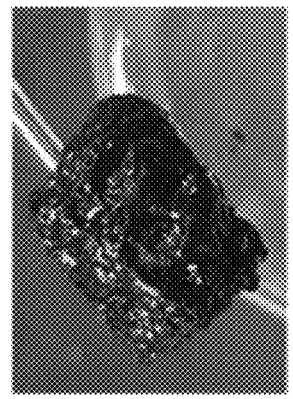
FIG. 1B shows appearance of the RGO-Ni—Fe product in autoclave after the reaction, according to one embodiment of the invention.

In this exemplary embodiment, the one-pot production of the RGO-Ni—Fe foam was very sensitive to the pH of the GO-Ni—Fe mixture. Only in a narrow pH range, one-pot assembled sturdy RGO-Ni—Fe foam can be produced. Factors including different pH levels and the starting stoichiometric ratios of GO and Ni—Fe (Ni/Fe=3:1) [14, 16] were systematically studied. The one-pot RGO-Ni—Fe foam can only be formed under a narrow pH range around 3.5 and the optimal condition was determined as pH=3.5 and C:Ni:Fe=14:1:0.33. In other conditions, the reactions resulted in a mixture of RGO and Ni—Fe oxide-related products, and a stable 3D RGO-Ni—Fe foam structure cannot be produced. To grow the RGO-Ni—Fe foam, the solutions of about 0.10 M nickel (II) nitrate and about 0.10 M Iron (III) nitrate were first prepared by dissolving $Ni(NO_3)_2 \cdot 6H_2O$ and $Fe(NO_3)_3 \cdot 9H_2O$ into deionized water (MilliQ water 18.2 MΩ·cm), respectfully. About 10 mL of the homogeneous graphene oxide aqueous suspension was mixed under stirring with about 0.75 mL of $Ni(NO_3)_2$ solution and about 0.25 mL of $Fe(NO_3)_3$ solution to form a GO-Ni—Fe mixture. The pH of the GO-Ni—Fe mixture was then adjusted to around 3.5 by carefully adding a NaOH solution. Afterwards, the mixture was lightly ultrasonicated for several minutes to get rid of air bubbles that were trapped in the gel-like mixture. The mixture was then sealed in the autoclave for hydrothermal reaction at about 180° C. for about 9 h. After the reaction, a cylindrical foam sitting in a colorless solution was observed in the autoclave (FIG. 1B), suggesting successful one-pot growth of the RGO-Ni—Fe foam, where all nickel-iron oxide particles were embedded in the porous structure of the 3D RGO foam. The resulting RGO-Ni—Fe foam was taken out of the autoclave and washed with deionized water for several times. The RGO-Ni—Fe foam was then freeze-dried under about 0.05 mbar vacuum at about −50° C. to obtain the RGO-Ni—Fe solid foam (also termed as "RGO-Ni—Fe foam" in the disclosure). The foam has a cylindrical shape with an approximate diameter of about 1.5 cm and the height of about 1.5 cm. The fabrication process of the exemplary embodiment is shown in FIG. 1A.

Thermal Treatment of RGO-Ni—Fe Foams

In this exemplary embodiment, the RGO-Ni—Fe foam was annealed in a tube furnace at about 500° C. under the protection of $N_2$ for about one hour. Then the RGO-Ni—Fe sample was cooled down to room temperature and ready for use (also termed as "RGO-Ni—Fe foam 500° C." in the disclosure).

Preparation of a RGO-Ni—Fe Membrane

In one embodiment, as a comparison to the RGO-Ni—Fe foam, a RGO-Ni—Fe membrane was also prepared via vacuum filtration. Specifically, about 20 mL of the GO suspension solution was mixed under stirring with about 1.5 mL of 1.0 M $Ni(NO_3)_2$ and about 0.5 mL of 1.0 M $Fe(NO_3)_3$ solutions based on the ratio C:Ni:Fe=1.4:1:0.33, with the amount of Ni and Fe about 10 times more than that in the foam samples. Then, about 4.5 mL of 1.0 M NaOH solution was slowly added to the mixture and stirred for about 30 min at about 70° C. After that, the gel-like mixture was filtered through a 0.8 µm pore-size ATTP filter membrane via vacuum filtration. The resulting GO-Ni—Fe membrane was then thermally annealed at about 500° C. for about 1 h under the protection of $N_2$ (also termed as "RGO-Ni—Fe film 500° C." in the disclosure).

Materials Characterizations

The RGO-Ni—Fe samples were characterized by XPS, XRD, Raman spectroscopy, SEM, and TEM. XPS samples were drop-dried onto silicon substrates and measured on a K-Alpha X-ray XPS System equipped with monochromatic Al Kα (h λ=1486.6 eV). XRD data were collected using a Rigaku MiniFlex 600 XRD system for a step size of about 0.02 and dwell time of about 5°/min in the 2θ range of 3°-80° at standard potential and current settings of about 40 kV and about 15 mA, employing a monochromatic Cu Kα target radiation source (λ=1.5418 Å). Raman spectroscopy was performed using an EZ Raman-N microscope (excitation wavelength 532 nm) at about 50% power, room temperature, solid samples on silicon wafer. The morphology and microstructure of the samples were analyzed using a JEOL 7000F SEM with energy-dispersive X-ray (EDX) analysis of the composition. TEM imaging was performed using JEOL 2100F TEM, operated at 60 kV.

Sample Preparation for Electrochemical Measurements

In one embodiment, to prepare the RGO-Ni—Fe catalyst samples on glassy carbon disk electrodes (MF-2012, BASi), about 1 mg of the RGO-Ni—Fe foam sample was mixed with about 100 µl of DI water, about 100 µl of ethanol, and about 5 µl of about 5 wt % Nafion® solution (Sigma-Aldrich) by at least 15 min ultrasonication to form a homogeneous catalyst ink. Afterwards, about 5 µl of the ink was drop-casted and dried on to a glassy carbon electrode of about 3 mm in diameter, with loading of about 0.35 mg/cm$^2$ including RGO, which about 70% of the loading, about 0.24 mg/cm$^2$, is on the active area of the electrode. The RGO-Ni—Fe membrane sample was also prepared on a glassy carbon working electrode using the same method.

Electrochemical Measurements

In one embodiment, to examine the electrochemical OER catalytic activities, a standard three-electrode electrochemical system was investigated using a BASi Epsilon electrochemical workstation. The catalyst ink-loaded glassy carbon disk electrode was used as a working electrode. A Pt wire electrode (MW-1032, BASi) mounted in a CTFE cylinder was used as a counter electrode. A saturated calomel electrode (SCE, Thermo Scientific) was selected as the reference electrode with a potential of about 1.043 V versus RHE in 1 M KOH (prepared from KOH pellets/certified ACS, Fischer Chemical), calibrated against a HydroFlex hydrogen reference electrode (ET070, EQAD). No contributions for the OER from 1 M KOH were observed. The electrochemistry workstation was used to measure the cyclic voltammetry (CV) and the linear sweep voltammetry (LSV). The CV measurements were conducted in a voltage window from about −0.8 to about 0.8 V (vs. SCE) with scan rates typically of about 50-100 mV/s. The LSV measurements were performed in a potential window of about 0-0.8V (vs. SCE) under a constant sweep rate of about 5 mV/s. The potentials were referred to RHE and were iR-corrected, unless noted. All of the electrochemical measurements were performed under 1 atmosphere in air and at room temperature.

Growth of RGO and RGO-Ni—Fe Foams

Figure 1C:
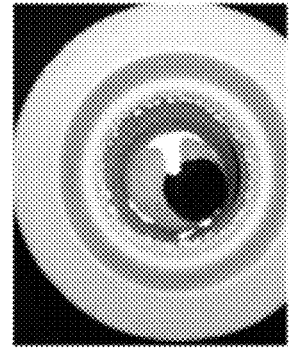
FIG. 1C shows a RGO-$MoS_2$ foam produced from a one-pot hydrothermal growth, according to one embodiment of the invention.

In one embodiment, the hydrothermal method is chosen to fabricate 3D porous RGO foams because of its unique features. In general, hydrothermal reduction is a chemical reduction method for GO, usually performed in a sealed container, so the solvent can be brought to a temperature well above its boiling point by the increase of pressure resulting from heating. In a typical hydrothermal process, overheated supercritical water can play the role of reducing agent and offers a green chemistry alternative to organic solvents [27-29]. However, in the experimental condition, the temperature used is about 180° C., below 374° C., the critical temperature of water. Therefore, the supercritical water does not exist. The water may play an important role as discussed by West [30]. The water serves as the pressure transmitting agent in the forms of liquid and vapor. It enables reactions to happen with possible enhanced solubility under pressure and with the aid of liquid and vapor phases. In addition, its physiochemical properties can be widely changed with changes in pressures and temperatures, which allows the catalysis of a variety of ionic bond cleavage reactions in water [29]. So a stable and homogeneous dispersion of reduced nanosheets, RGO, can be produced. Most of reported results regarding RGO foam formation [18, 20] are based on GO from the modified Hummers method [24]. In certain embodiments, the modified Hummers GO can be used to grow a relatively sturdy cylindrical GO foam at a wide pH range tested, from 1.5 to 11.5. On the other hand, the improved Tour GO [31] can form stable 3D porous foams in a relatively narrow pH range and the foam formation is sensitive to the autoclave inner surface cleanness. As shown in FIG. 1C, 3D RGO-$MoS_2$ foam was synthesized using Tour GO at pH=5.8, with starting materials of $Na_2MoO_4$ and L-cysteine [32]. For one-step hydrothermal production of RGO-Ni—Fe foams, the requirement for pH levels is even more stringent. After trials and errors, it was found that only in a narrow pH range around 3.5, one-pot assembled 3D RGO-Ni—Fe foam can be successfully produced by using the modified Hummers GO, with the ratio C:Ni:Fe=14:1:0.33.

RGO Foam and RGO-Ni—Fe Foam Characterizations

Figure 2A:
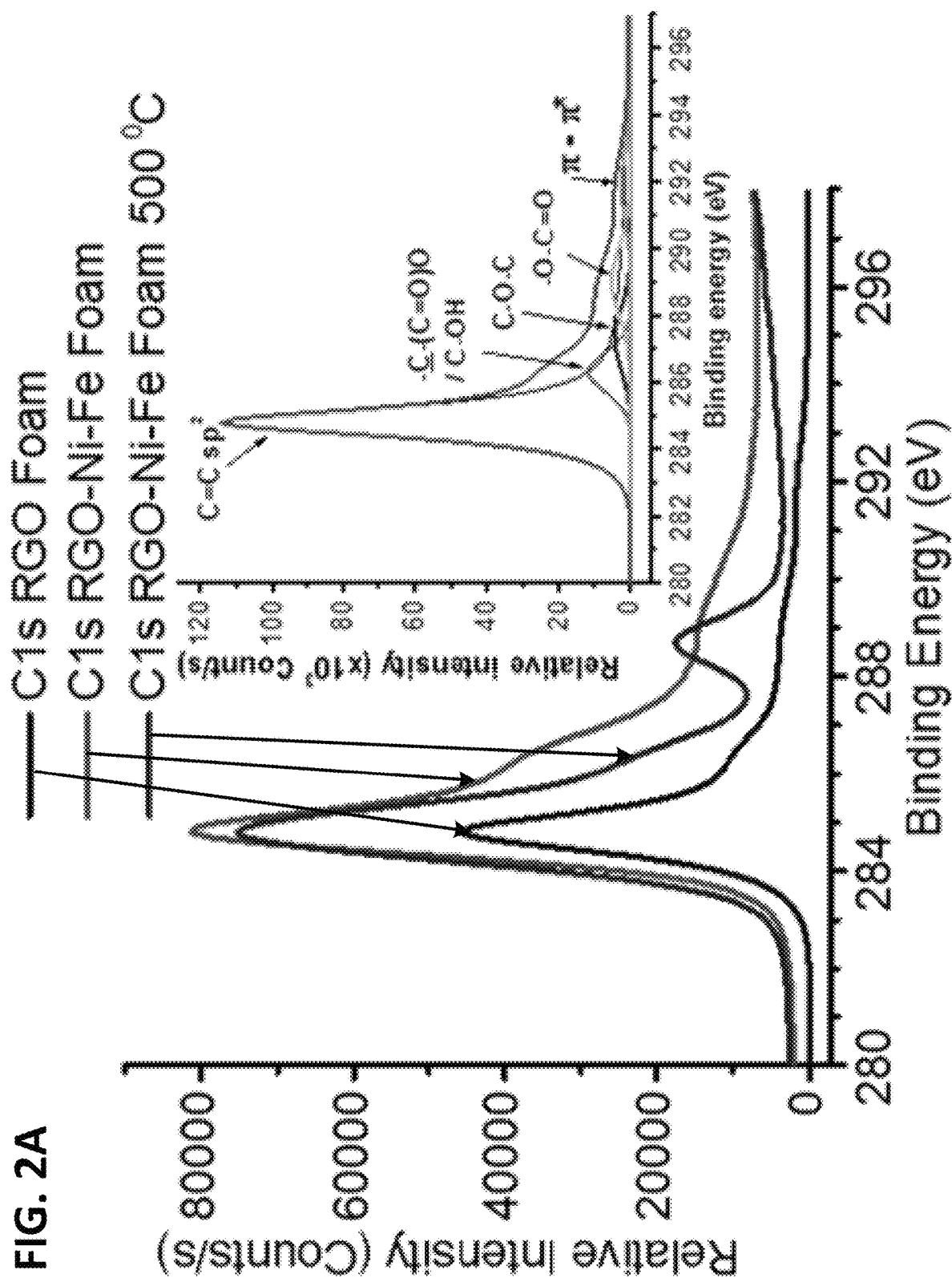
FIG. 2A shows C is XPS spectra of three RGO foam samples, according to embodiments of the invention. The insert in FIG. 2A shows the bond assignment of the C is spectrum of the RGO foam sample.
Figures 2B, 2C:
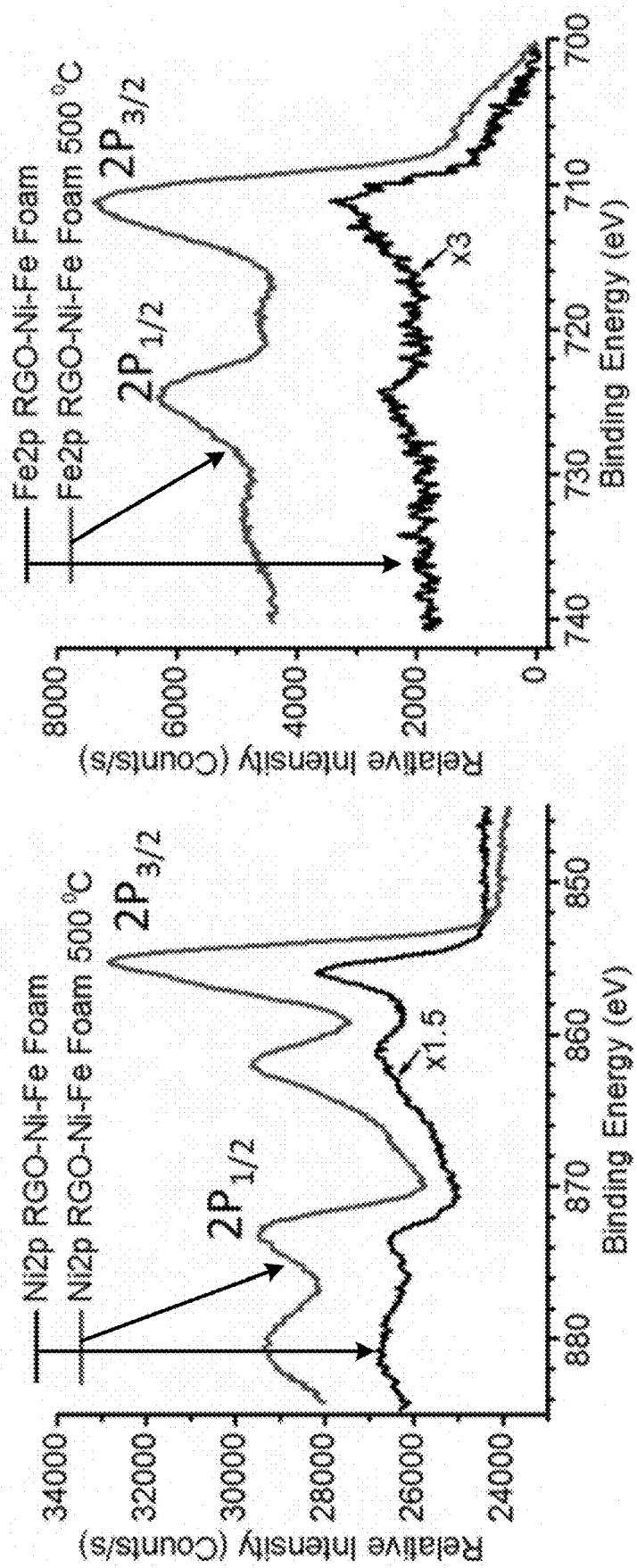
FIG. 2B shows Ni 2p XPS spectra of two RGO-Ni—Fe foam samples, according to embodiments of the invention.
FIG. 2C shows Fe 2p XPS spectra of two RGO-Ni—Fe foam samples, according to embodiments of the invention.

As discussed in the previous work [20], under the hydrothermal synthesis conditions, reactions are expected between/among the hydroxyl, carboxyl, and epoxy functional groups of adjacent GO sheets to generate aromatic ether and ester bonds between the sheets, mainly at the edges [20, 27]. C1s XPS analysis reveals that the RGO foams made via the hydrothermal process contained the dominant C═C bonds (about 284.8 eV), hydroxyl C—OH (about 286 eV), ether C—O (about 287 eV), and ester C(═O)O (about 289 eV) bonds (FIG. 2A). The π-π* shake-up satellite peak was observed for the GO foam around about 292 eV [33]. This indicated that the delocalized π conjugation, a characteristic of aromatic C structure, was partially restored in RGO foam samples [34, 35]. Similarly, for the C1s XPS spectra of the RGO-Ni—Fe sample and the RGO-Ni—Fe foam 500° C. sample shown in FIG. 2A, in addition to the dominant C═C bonds (about 284.8 eV), the peaks of the ether C—O (about 287 eV) and ester C(═O)O (about 289 eV) bonds were also observed. XPS spectra (FIGS. 2B-2C) also corroborated the existence of both Ni and Fe in the two hybrid foam materials. The Ni species was mostly in the +2 oxidation state from the Ni 2p spectra (FIG. 2B), with Ni $2p_{3/2}$ binding energies close to 855.6 eV. The Fe species was mostly in the +3 oxidation state from the Fe 2p spectra (FIG. 2C) [13].

Figure 3:
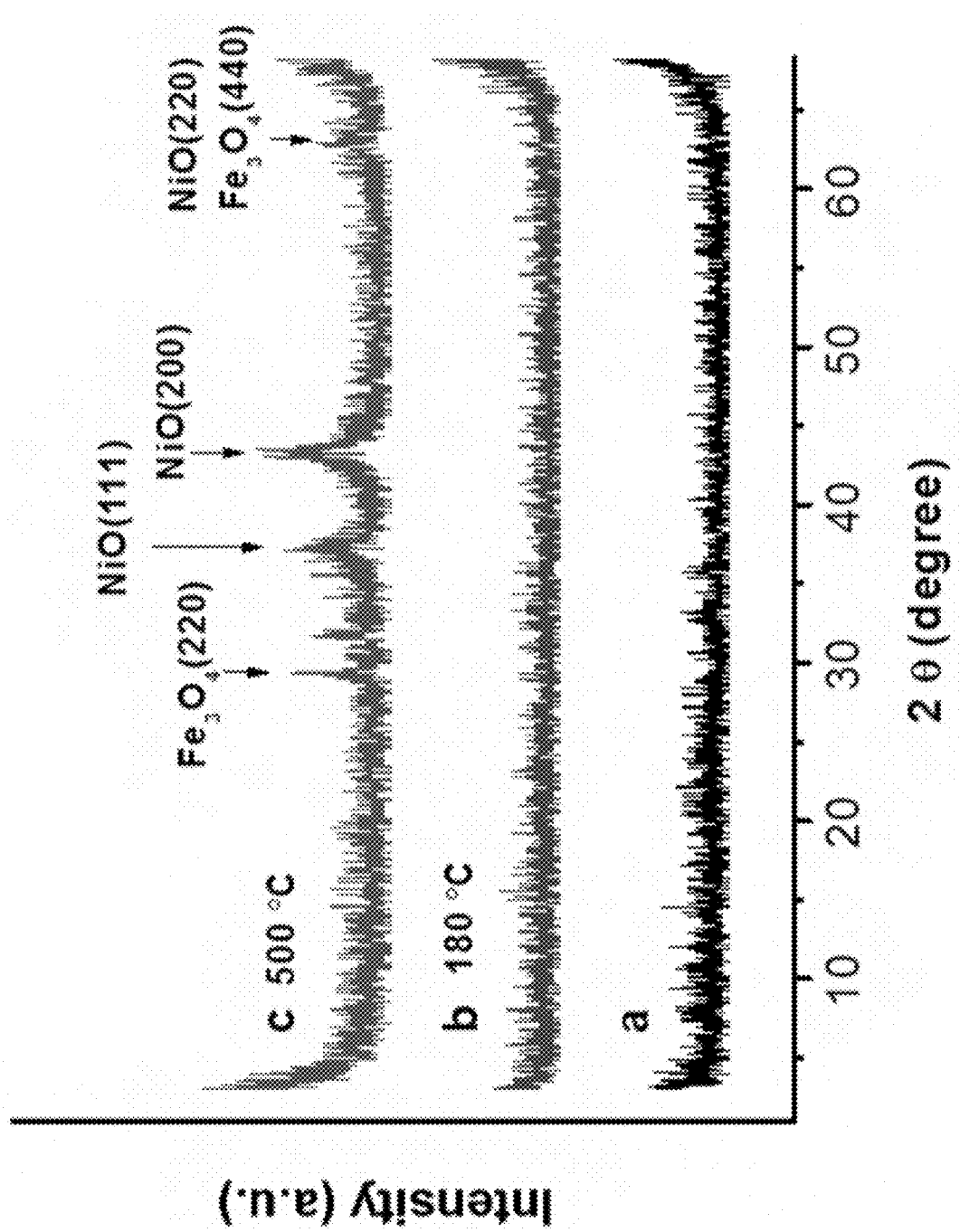
FIG. 3 shows XRD patterns of (a) GO-Ni—Fe gel-like mixture before hydrothermal reaction; (b) RGO-Ni—Fe foam from hydrothermal reaction; and (c) RGO-Ni—Fe foam further annealed at about 500° C., according to embodiments of the invention.

The phase structures of RGO-Ni—Fe samples were measured by XRD, as shown in FIG. 3. Almost no peaks were observed for the GO-Ni—Fe gel-like mixture sample, as shown in curve (a) of FIG. 3, and the RGO-Ni—Fe foam sample, as shown in curve (b) of FIG. 3, indicating that either the sample was poorly crystallized (the GO-Ni—Fe gel-like mixture sample) or the crystalline size of the sample (the RGO-Ni—Fe foam sample) was too small to be detected in XRD (<5 nm), as observed by other groups previously [14, 36]. When annealing at about 500° C., as shown in curve (c) of FIG. 3, a few peaks were observed. The peaks centered at around 37.5 and 43.2° corresponded to NiO (111) and NiO (200), respectively. The diffraction peak centered at around 2 θ=29.3° corresponded to the (220) plane of $Fe_3O_4$, and the 63.0° peak corresponded to the (220) plane of NiO or the (440) plane of $Fe_3O_4$ [14]. The observed $Fe_3O_4$ peaks suggested the further reduction of $Fe_2O_3 \rightarrow Fe_3O_4$ when annealing at about 500° C. The XRD data were further corroborated with Raman spectra and TEM images.

Figure 4:
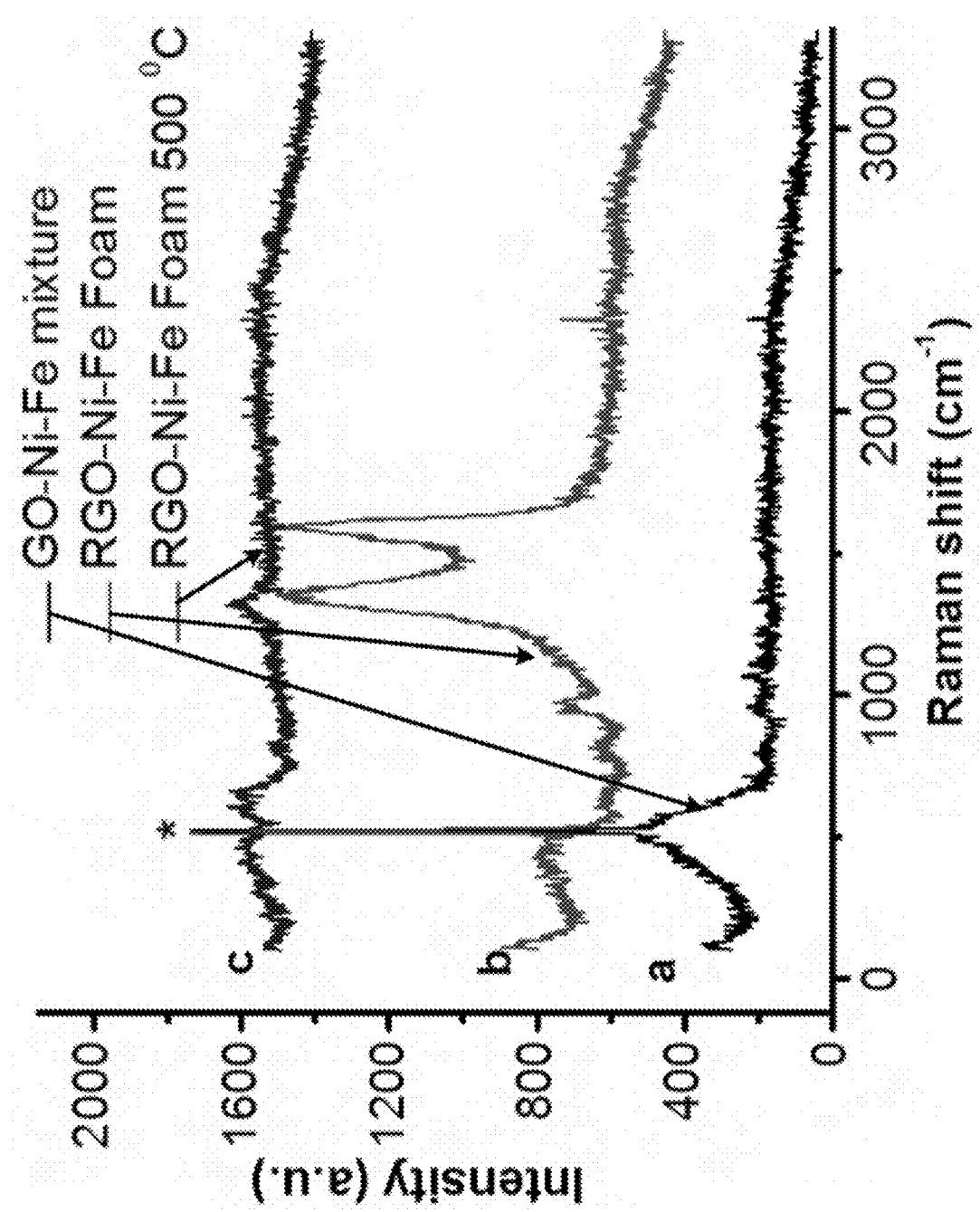
FIG. 4 shows Raman spectra of RGO-Ni—Fe hybrid materials: (a) a GO-Ni—Fe gel-like mixture before hydrothermal reduction; (b) a RGO-Ni—Fe foam from hydrothermal reduction; and (c) a RGO-Ni—Fe foam further annealed at about 500° C., according to embodiments of the invention. The lines marked with the asterisk near 520 cm$^{-1}$ is from Si substrate.

Raman spectra shown in FIG. 4 further revealed the structural information of the samples. Initially, the GO-Ni—Fe gel-like mixture shows no observable D band (1350 $cm^{-1}$) and G band (1590 $cm^{-1}$) of GO, but a broad peak at about 510 $cm^{-1}$ coming from the M—O (mainly Ni—O) vibrational band of the disordered Ni—Fe hydroxides in the GO-Ni—Fe gel-like mixture [17]. When the sample was hydrothermally treated at about 180° C., GO was reduced to better crystallized RGO foam with enhanced Raman intensity at about 1350 $cm^{-1}$ and about 1590 $cm^{-1}$. The disordered Ni—Fe hydroxides became crystallized with the Ni—O band peak position shifting to the red at about 450 $cm^{-1}$. When annealed at about 500° C., an additional band at about 560-670 $cm^{-1}$ appeared, which could be related to $Fe_2O_3$ and $Fe_3O_4$ [17]. The D and G bands almost disappeared, suggesting a dramatic decrease in the amount of RGO.

Figures 5A, 5B, 5C:
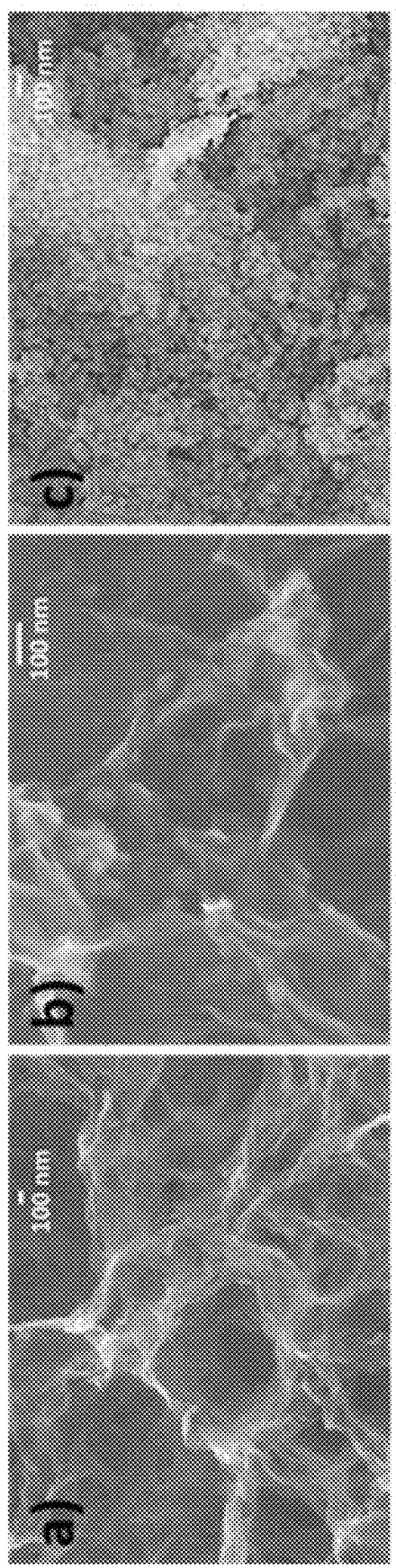
FIGS. 5A-5C show SEM images of a RGO foam through a hydrothermal process, RGO-Ni—Fe foam fabricated from hydrothermal reaction, and a RGO-Ni—Fe foam further annealed at about 500° C., respectively, according to embodiments of the invention.

SEM image in FIG. 5A shows the porous 3D structures of RGO foam. The functional groups, such as hydroxyl, carboxyl, and epoxy groups that are mainly located on GO sheets edges, were covalently interconnected and cross-linked with each other during the hydrothermal process, thereby forming a monolithic 3D chemically linked RGO network [18, 20]. This unique 3D structure can accommodate the active sites of NiFe oxide nanoparticles, facilitate their electron transfer at electrode surfaces, and maintain their electrochemical activities. The RGO-Ni—Fe foam sample has a well-defined and interconnected 3D porous network as imaged by SEM in FIG. 5B. The NiFe oxide nanoparticles were grown on the 3D RGO backbones. The pore sizes of the network are in the range of sub-micrometers to several micrometers and the pore walls include thin layers of stacked graphene sheets. This 3D porous structure provides a good support for the NiFe oxide nanoparticles, greatly increases the electron transport and results in a larger surface area. In comparison, the foam after annealed at about 500° C., lost some of the RGO, with an increase of Ni—Fe nanoparticle concentration in the sample, as shown in FIG. 5C.

Figure 6A:
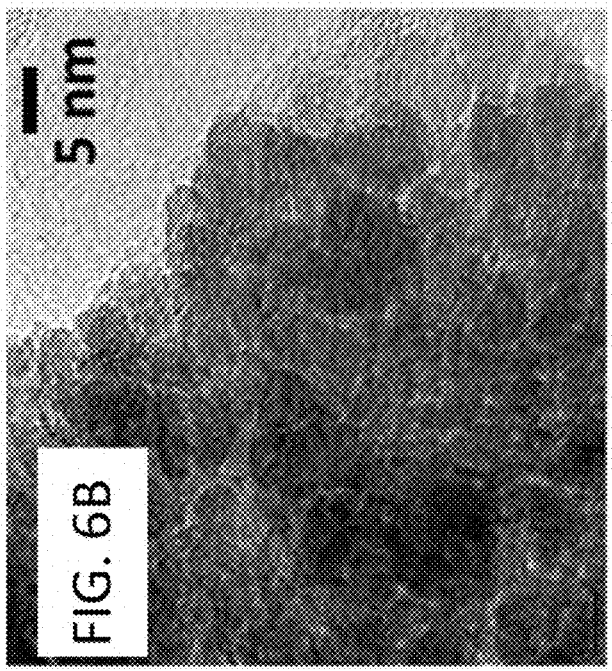
FIGS. 6A-6B show TEM images of a hydrothermally fabricated RGO-Ni—Fe foam in different scales, according to one embodiment of the invention.
Figure 6B:
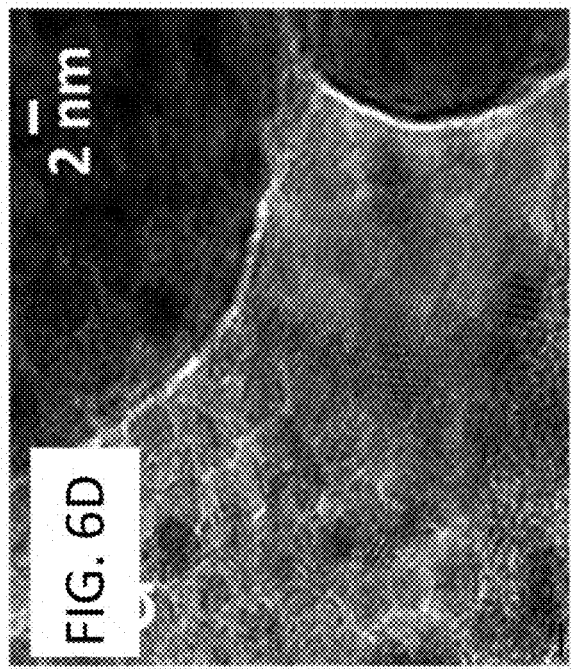
Figure 6C:
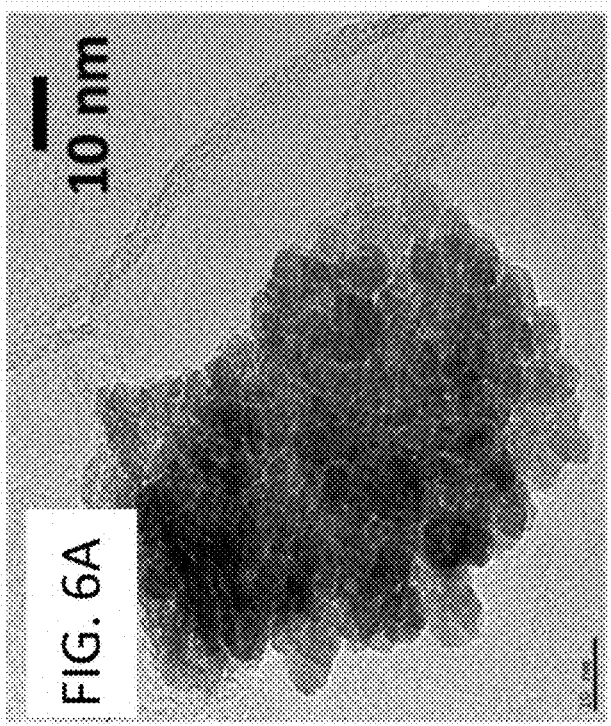
FIGS. 6C-6D show TEM images of a RGO-Ni—Fe foam annealed at about 500° C. in different scales, according to one embodiments of the invention.
Figure 6D:
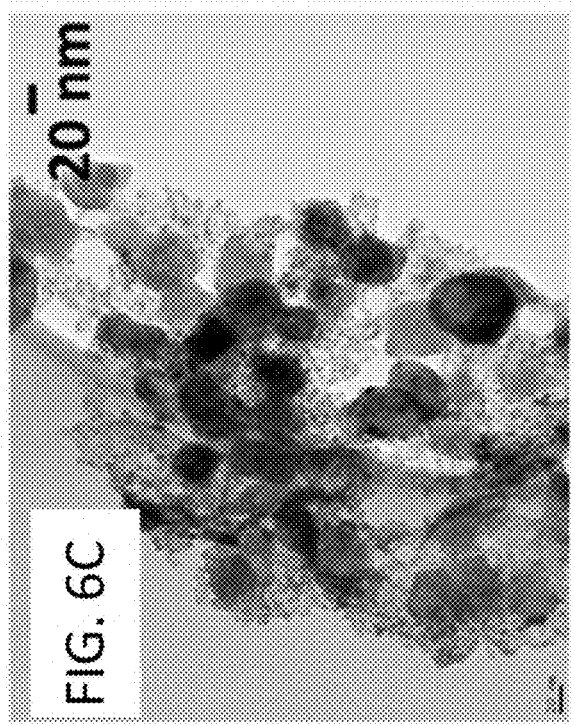

TEM images showed distinct differences between the RGO-Ni—Fe foam sample and its 500° C. annealed sample. As shown in FIGS. 6A-6B, NiFe oxide nanoparticles are roughly spherical with an average diameter of less than about 5 nm. However, after 500° C. annealing, in addition to the small Ni—Fe oxide nanoparticles of about 2-5 nm in diameter, large particles of about 20-30 nm in diameter were observed, accompanying with the decomposition of RGO support, as shown in FIGS. 6C-6D. As a result, the sample annealed at about 500° C. might suggest an increased amount and size of Ni—Fe nanoparticles, a poorer electron transport due to loss of RGO, and a decreased surface area of RGO network.

RGO-Ni—Fe Samples on OER

Figure 7:
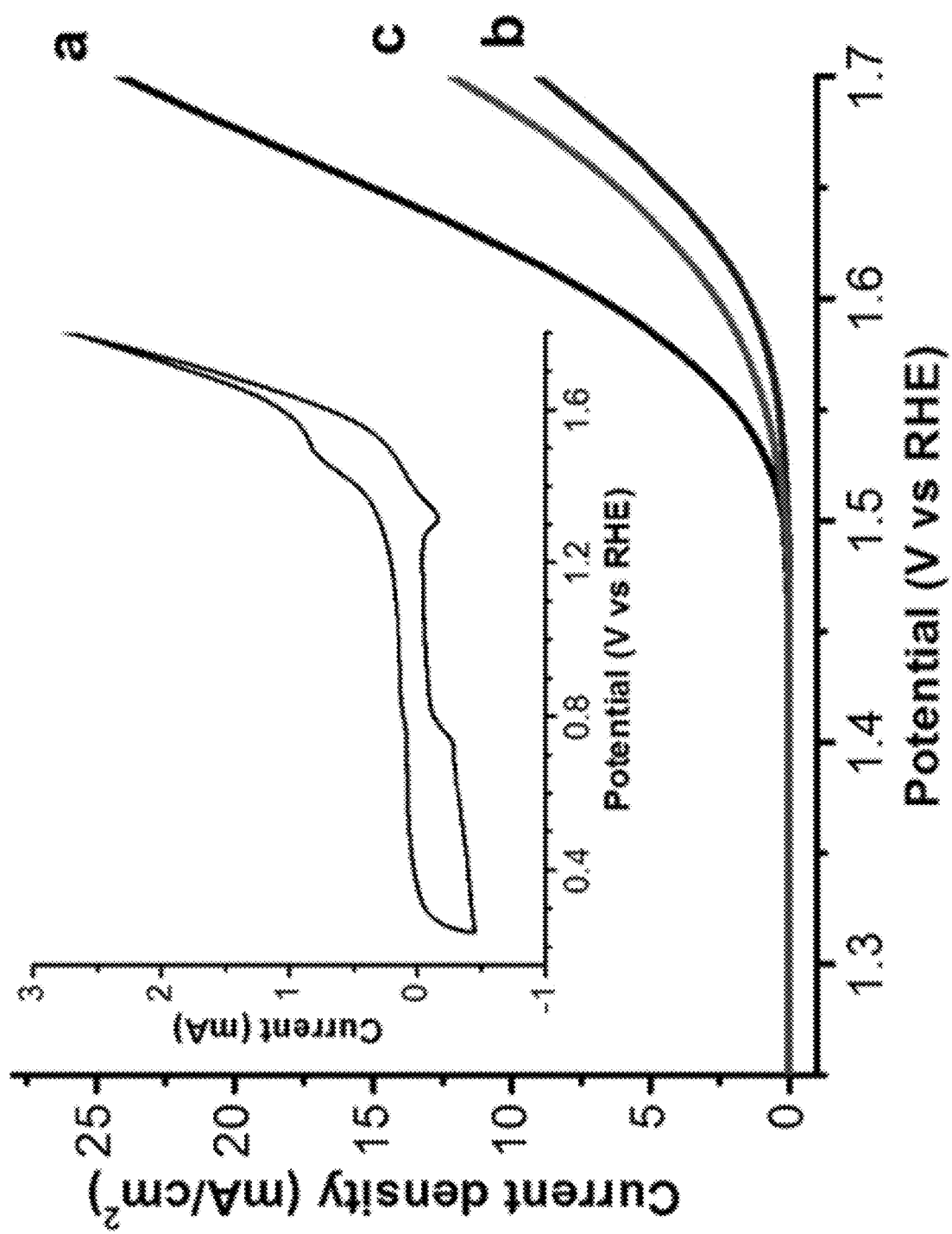
FIG. 7 shows polarization curves of (a) a RGO-Ni—Fe foam prepared by hydrothermal reduction, (b) a RGO-Ni—Fe foam annealed at about 500° C. and (c) a RGO-Ni—Fe membrane annealed at about 500° C., respectively, according to embodiments of the invention. The insert is the CV of the RGO-Ni—Fe foam sample, showing the peak around 1.48 V for the Ni(II)/Ni(III or IV) redox process.

Shown in the insert of FIG. 7 is the CV of the RGO-Ni—Fe foam sample. The peak around 1.48 V is assigned to the Ni(II)/Ni(III or IV) redox process [13]. The polarization curves in FIG. 7 clearly show that all three RGO-Ni—Fe samples were able to produce oxygen when used as an electrocatalyst. The RGO-Ni—Fe foam sample achieved a current density of about 24.5 mA/cm² at about 1.7 V, indicating the highest electrocatalytic ability among the three samples. Its onset of oxygen evolution took place at about 1.46 V. In addition, the sample achieved a current density of about 10 mA/cm² at the potential of about 1.62 V, while the RGO-NiO/Ni foam 500° C. sample had an about 10 mA/cm² current density at a higher potential of about 1.71 V. In comparison, the 500° C. annealed RGO-NiO/Ni membrane sample had an about 10 mA/cm² current density at about 1.68 V (Table 1). The result indicates that the RGO-Ni—Fe foam had the better electrocatalytic performance than the other two RGO-Ni—Fe samples annealed at 500° C. Since the onset potentials are almost the same for the three samples, as listed in Table 1, the intrinsic OER activities for the three samples are similar. The difference in OER current densities at a given OER potential, for example, at about 1.6 V vs. RHE in FIG. 7, could be caused by the difference in a few factors, including the number of active sites, the conductivity of RGO, and the surface area needed for electron transfer and ion transport in the samples. The result suggests that further improvement of OER activities for RGO-Ni—Fe foam is possible, by optimizing these factors.

TABLE 1

Comparison of OER properties of Ni-Fe oxide and Ir/C electrocatalysts in 1M KOH solution.

| Sample | Onset potential (V) | Potential at 10 mA/cm² (V) | Tafel slope (mV/dec) | Reference |
|---|---|---|---|---|
| RGO-Ni-Fe Foam | 1.46 | 1.62 | 57 | This invention |
| RGO-Ni-Fe Foam 500° C. | 1.47 | 1.71 | 75 | This invention |
| RGO-Ni-Fe Film 500° C. | 1.46 | 1.68 | 87 | This invention |
| Ni-Fe-CNT | 1.45 | 1.47 | 31 | [13] |
| Pristine Ni-Fe-CFP | 1.50 | 1.57 | 44.0 | [14] |
| 2-cycle Ni-Fe-CFP | 1.43 | 1.48 | 31.5 | [14] |
| Ni-Fe-NGF (0.1M KOH) | 1.49 | 1.57 | 45 | [16] |
| Ir/C | 1.47 | 1.52 | 39.2 | [14] |
| Ir/C (0.1M KOH) | 1.48 | 1.64 | 54 | [16] |

It is worthwhile to discuss the use of carbon materials on the anode because of the concern of electrochemical oxidation of carbon [37]. Recently, there have been an increasing number of reports that carbon materials are used in the anode side as a support or scaffold for nanostructural catalysts in alkaline solution. The graphene-based carbon materials include carbon nanotubes [13], carbon fibers [14, 38], reduced graphene oxide [16, 39], and graphene shells [40]. The anodes show excellent stability under the water splitting tests. The contributions of the carbon support for OER are usually negligible below about 1.65 V vs RHE [9]. However, recent experimental data indicate that with the carbon support, Ni—Fe oxide-based water splitting can be run at about 1.8 V for a long period of time without degradation [14], suggesting the stability of the anode with the carbon support. In contrast, carbon supported Pt and Ir benchmark catalysts showed an unstable water splitting performance, which decayed over time [14]. In addition, the Ni—Fe nanocatalysts on the carbon supports were bifunctional and lowered the HER and OER overpotentials, so water splitting reaction can be effectively and stably run at about 1.51 V [14]. These results open the opportunities for the use of carbon supported nanocatalysts for OER in alkaline solution. Furthermore, reactive oxygen species (ROS) generated in the water oxidation progress contribute to the instability of catalytic materials [41]. The stability the carbon-supported Ni—Fe catalysts could be related to ROS scavenging properties of graphene-based materials [42]. These graphene-based materials like carbon nanotubes also present self-recovery capability from oxidation in alkaline conditions [43-48].

Figure 8:
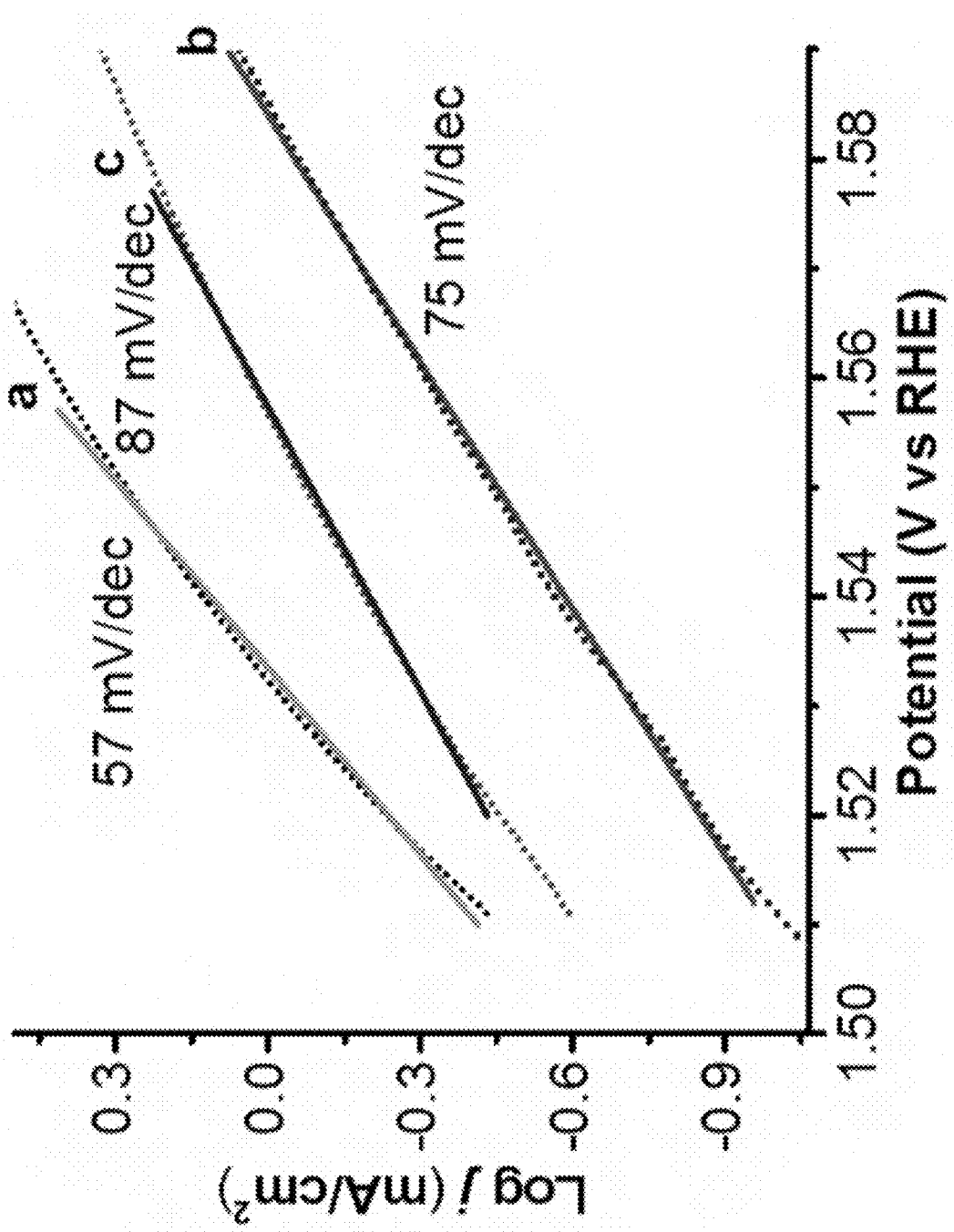
FIG. 8 shows Tafel plots of (a) a RGO-Ni—Fe foam produced by hydrothermal reduction, (b) a RGO-Ni—Fe foam annealed at about 500° C., and (c) a RGO-Ni—Fe membrane annealed at about 500° C., respectively, according to embodiments of the invention.

In one embodiment, the polarization curves are fitted to the Tafel equation $\eta = b \log(j/j_0)$, where $\eta$ is the overpotential, b is the Tafel slope, j is the current density, and $j_0$ is the exchange current density [49]. The Tafel slope indicated the increase of the overpotential required in order to raise the current density by 10-fold [12, 50, 51]. A smaller increase in overpotential, as represented by a smaller Tafel slope value, would mean a more efficient OER. The Tafel slope, along with the slope values, was displayed in FIG. 8. The RGO-Ni—Fe foam sample exhibited a Tafel slope of about 57 mV/decade in 1 M KOH. This value was the closest one to that of the Ir/C reference (about 40 mV/decade) [13, 14, 49]. The RGO-Ni—Fe foam 500° C. sample had a Tafel slope of about 75 mV/decade, weaker than that of as-prepared 3D RGO-Ni—Fe foam sample. This might be explained by the fact that the further heat annealing processes had a negative impact to the 3D porous structure of the RGO foam by increasing the sizes of Ni—Fe nanoparticles and decreasing the surface area of RGO, which resulted in a weaker electron transport and poorer catalytic ability. It is worth noting that the RGO-Ni—Fe membrane sample, made through vacuum filtration then followed by annealing at about 500° C. (the amount of Ni and Fe was 10 times more than that in the foam samples), exhibited the largest value of Tafel slope of about 87 mV/decade. This might be partly caused by the insufficient surface area of the catalyst in the membrane, for which, further study is underway. The electrochemical performances of RGO-Ni—Fe samples were summarized in Table 1, together with a few benchmark Ni—Fe oxide electrocatalysts synthesized from other research groups. The OER properties of the RGO-Ni—Fe foam sample are close to those of pristine Ni—Fe—CFP [14] and approach those of other listed superior samples [13, 14, 16]. The OER performance of the RGO-Ni—Fe foams could be further improved by tuning other synthesis factors such as temperatures and solvents etc., in addition to pH.

In brief, according to the invention, nanoscale Ni and Fe mixed oxide OER nanoparticles embedded in 3D reduced graphene oxide foam network (RGO-Ni—Fe foam) and 3D RGO-MoS₂ HER foam were successfully synthesized through the simple one-pot hydrothermal process according to embodiments of the invention. With a focus on the RGO-Ni—Fe foam, the as-prepared RGO-Ni—Fe foam sample, together with the foam sample annealed at about 500° C. and a RGO-Ni—Fe membrane sample were evaluated for their OER properties. The highest OER activity of the electrocatalysts was observed for the RGO-Ni—Fe foam sample, and the Tafel slope of about 57 mV per decade was achieved and comparable to those of iridium catalyst [14] and Ni—Fe nanocompounds synthesized by other groups [13, 14, 16]. The relatively high catalytic activity of the sample was possibly attributed to the nanoscopic NiO/FeO$_x$ interfaces in the graphene 3D structure with an enhanced surface area that was ideally suited for electron transfer and ion transport. The highly active RGO-Ni—Fe hybrid foam catalyst with low cost, earth abundance and environmental friendliness is promising for future water-splitting devices. Further development of self-assembling 2D graphene sheets into complex 3D macrostructures is being carried out for further understanding their assembly behaviors and producing graphene-based materials with industrial interests. Among other things, the approach can be applied to develop other viable, environmentally friendly, and earth-abundant OER and HER catalysts for water splitting, and other applications related to hydrogen fuel, space applications, biomedical applications, and tissue engineering. The approach can be efficiently used at room-temperature, in contrast with current high temperature methods.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

LISTING OF REFERENCES

[1]. Cook, T. R.; Dogutan, D. K.; Reece, S. Y.; Surendranath, Y.; Teets, T. S.; Nocera, D. G. Solar Energy Supply and Storage for the Legacy and Nonlegacy Worlds. *Chem. Rev.* 2010, 110, 6474-6502.

[2]. Lewis, N. S. Toward Cost-Effective Solar Energy Use. *Science* 2007, 315, 798-801.

[3]. Ma, W.; Ma, R.; Wang, C.; Liang, J.; Liu, X.; Zhou, K.; Sasaki, T. A superlattice of alternately stacked Ni—Fe hydroxide nanosheets and graphene for efficient splitting of water. *ACS Nano* 2015, 9, 1977-84.

[4]. Gong, M.; Dai, H. J. A Mini Review of NiFe-Based Materials as Highly Active Oxygen Evolution Reaction Electrocatalysts. *Nano Res.* 2015, 8, 23-39.

[5]. Kim, T. W.; Choi, K.-S. Nanoporous BiVO4 Photoanodes with Dual-Layer Oxygen Evolution Catalysts for Solar Water Splitting. *Science* 2014, 343, 990-994.

[7]. Chemelewski, W. D.; Lee, H. C.; Lin, J. F.; Bard, A. J.; Mullins, C. B. Amorphous FeOOH Oxygen Evolution Reaction Catalyst for Photoelectrochemical Water Splitting. *J. Am. Chem. Soc.* 2014, 136, 2843-50.

[7]. Trotochaud, L.; Ranney, J. K.; Williams, K. N.; Boettcher, S. W. Solution-cast metal oxide thin film electrocatalysts for oxygen evolution. *J. Am. Chem. Soc.* 2012, 134, 17253-61.

[8]. Carmo, M.; Fritz, D. L.; Mergel, J.; Stolten, D. A comprehensive review on PEM water electrolysis. *Int. J. Hydrogen Energ.* 2013, 38, 4901-4934.

[9]. Losiewicz, B. *Electrocatalysts for Hydrogen Energy.* Trans Tech Publications Ltd: Pfaffikon, Switzerland, 2015.

[10]. Yeo, B. S.; Bell, A. T. Enhanced Activity of Gold-Supported Cobalt Oxide for the Electrochemical Evolution of Oxygen. *J. Am. Chem. Soc.* 2011, 133, 5587-5593.

[11]. McCrory, C. C.; Jung, S.; Peters, J. C.; Jaramillo, T. F. Benchmarking heterogeneous electrocatalysts for the oxygen evolution reaction. *J. Am. Chem. Soc.* 2013, 135, 16977-87.

[12]. Gong, M.; Zhou, W.; Tsai, M.-C.; Zhou, J.; Guan, M.; Lin, M.-C.; Zhang, B.; Hu, Y.; Wang, D.-Y.; Yang, J.; Pennycook, S. J.; Hwang, B.-J.; Dai, H. J. Nanoscale Nickel Oxide/Nickel Heterostructures for Active Hydrogen Evolution Electrocatalysis. *Nat. Commun.* 2014, 5, 4695.

[13]. Gong, M.; Li, Y.; Wang, H.; Liang, Y.; Wu, J. Z.; Zhou, J.; Wang, J.; Regier, T.; Wei, F.; Dai, H. An Advanced Ni—Fe Layered Double Hydroxide Electrocatalyst for Water Oxidation. *J. Am. Chem. Soc.* 2013, 135, 8452-5.

[14]. Wang, H.; Lee, H.-W.; Deng, Y.; Lu, Z.; Hsu, P.-C.; Liu, Y.; Lin, D.; Cui, Y. Bifunctional Non-Noble Metal Oxide Nanoparticle Electrocatalysts through Lithium-Induced Conversion for Overall Water Splitting. *Nat. Commun.* 2015, 6, 7261.

[15]. Li, Y.; Wang, H.; Xie, L.; Liang, Y.; Hong, G.; Dai, H. MoS$_2$ Nanoparticles Grown on Graphene: An Advanced Catalyst for the Hydrogen Evolution Reaction. *J. Am. Chem. Soc.* 2011, 133, 7296-7299.

[16]. Tang, C.; Wang, H. S.; Wang, H. F.; Zhang, Q.; Tian, G. L.; Nie, J. Q.; Wei, F. Spatially Confined Hybridization of Nanometer-Sized NiFe Hydroxides into Nitrogen-Doped Graphene Frameworks Leading to Superior Oxygen Evolution Reactivity. *Adv. Mater.* 2015, 27, 4516-4522.

[17]. Louie, M. W.; Bell, A. T. An Investigation of Thin-Film Ni—Fe Oxide catalysts for the Electrochemical Evolution of Oxygen. *J. Am. Chem. Soc.* 2013, 135, 12329-37.

[18]. Xu, Y.; Sheng, K.; Li, C.; Shi, G. Self-Assembled Graphene Hydrogel via a One-Step Hydrothermal Process. *ACS Nano* 2010, 4, 4324-4330.

[19]. Li, C.; Shi, G. Three-dimensional graphene architectures. *Nanoscale* 2012, 4, 5549-5563.

[20]. Wu, Y.; Yi, N.; Huang, L.; Zhang, T.; Fang, S.; Chang, H.; Li, N.; Oh, J.; Lee, J. A.; Kozlov, M.; Chipara, A. C.; Terrones, H.; Xiao, P.; Long, G.; Huang, Y.; Zhang, F.; Zhang, L.; Lepro, X.; Haines, C.; Lima, M. D.; Lopez, N. P.; Rajukumar, L. P.; Elias, A. L.; Feng, S.; Kim, S. J.; Narayanan, N. T.; Ajayan, P. M.; Terrones, M.; Aliev, A.; Chu, P.; Zhang, Z.; Baughman, R. H.; Chen, Y. Three-dimensionally bonded spongy graphene material with super compressive elasticity and near-zero Poisson's ratio. *Nat. Commun.* 2015, 6, 6141.

[21]. To, J. W. F.; Chen, Z.; Yao, H.; He, J.; Kim, K.; Chou, H.-H.; Pan, L.; Wilcox, J.; Cui, Y.; Bao, Z. Ultrahigh Surface Area Three-Dimensional Porous Graphitic Carbon from Conjugated Polymeric Molecular Framework. *ACS Cent. Sci.* 2015, 1, 68-76.

[22]. Ren, L.; Hui, K. N.; Hui, K. S.; Liu, Y.; Qi, X.; Zhong, J.; Du, Y.; Yang, J. 3D hierarchical porous graphene aerogel with tunable meso-pores on graphene nanosheets for high-performance energy storage. *Sci. Rep.* 2015, 5, 14229.

[23]. Zhang, T.; Chang, H.; Wu, Y.; Xiao, P.; Yi, N.; Lu, Y.; Ma, Y.; Huang, Y.; Zhao, K.; Yan, X.-Q.; Liu, Z.-B.; Tian, J.-G.; Chen, Y. Macroscopic and direct light propulsion of bulk graphene material. *Nat. Photonics* 2015, 9, 471-476.

[24]. Kovtyukhova, N. I.; Ollivier, P. J.; Martin, B. R.; Mallouk, T. E.; Chizhik, S. A.; Buzaneva, E. V.; Gorchinskiy, A. D. Layer-by-Layer Assembly of Ultrathin Composite Films from Micron-Sized Graphite Oxide Sheets and Polycations. *Chem. Mater.* 1999, 11, 771-778.

[25]. Nair, R. R.; Wu, H. A.; Jayaram, P. N.; Grigorieva, I. V.; Geim, A. K. Unimpeded Permeation of Water Through Helium-Leak-Tight Graphene-Based Membranes. *Science* 2012, 335, 442-444.

[26]. Hummers, W. S.; Offeman, R. E. Preparation of Graphitic Oxide. *J. Am. Chem. Soc.* 1958, 80, 1339-1339.

[27]. Zhou, Y.; Bao, Q.; Tang, L. A. L.; Zhong, Y.; Loh, K. P. Hydrothermal Dehydration for the "Green" Reduction of Exfoliated Graphene Oxide to Graphene and Demonstration of Tunable Optical Limiting Properties. *Chem. Mater.* 2009, 21, 2950-2956.

[28]. Pei, S.; Cheng, H.-M. The reduction of graphene oxide. *Carbon* 2012, 50, 3210-3228.

[29]. Demazeau, G. Solvothermal Processes: A Route to the Stabilization of New Materials. *J. Mater. Chem.* 1999, 9, 15-18.

[30]. West, A. R. *Solid State Chemistry and Its Applications*. John Wiley & Sons: New York, 1984.

[31]. Marcano, D. C.; Kosynkin, D. V.; Berlin, J. M.; Sinitskii, A.; Sun, Z.; Slesarev, A.; Alemany, L. B.; Lu, W.; Tour, J. M. Improved Synthesis of Graphene Oxide. *ACS Nano* 2010, 4, 4806-4814.

[32]. Miao, J.; Xiao, F.-X.; Yang, H. B.; Khoo, S. Y.; Chen, J.; Fan, Z.; Hsu, Y.-Y.; Chen, H. M.; Zhang, H.; Liu, B. Hierarchical Ni—Mo—S Nanosheets on Carbon Fiber Cloth: A Flexible Electrode for Efficient Hydrogen Generation in Neutral Electrolyte. *Sci. Adv.* 2015, DOI: 10.1126/sciadv.1500259.

[33]. Perrozzi, F.; Prezioso, S.; Ottaviano, L. Graphene oxide: from fundamentals to applications. *J. Phys.: Condens. Matter* 2015, 27, 013002.

[34]. Bagri, A.; Mattevi, C.; Acik, M.; Chabal, Y. J.; Chhowalla, M.; Shenoy, V. B. Structural evolution during the reduction of chemically derived graphene oxide. *Nat. Chem.* 2010, 2, 581-587.

[35]. Mattevi, C.; Eda, G.; Agnoli, S.; Miller, S.; Mkhoyan, K. A.; Celik, O.; Mastrogiovanni, D.; Granozzi, G.; Garfunkel, E.; Chhowalla, M. Evolution of Electrical, Chemical, and Structural Properties of Transparent and Conducting Chemically Derived Graphene Thin Films. *Adv. Funct. Mater.* 2009, 19, 2577-2583.

[36]. Zhang, B.; Yang, S.; Zhang, Y.; Wang, Q.; Ren, T. Biotemplate-Directed Fabrication of Size-Controlled Monodisperse Magnetic Silica Microspheres. *Colloids Surf. B Biointerfaces* 2015, 131, 129-135.

[37]. Gallagher, K. G.; Fuller, T. F. Kinetic Model of the Electrochemical Oxidation of Graphitic Carbon in Acidic Environments. *Phys. Chem. Chem. Phys.* 2009, 11, 11557-11567.

[38]. Wang, A.-L.; Xu, H.; Li, G.-R. NiCoFe Layered Triple Hydroxides with Porous Structures as High-Performance Electrocatalysts for Overall Water Splitting. *ACS Energy Lett.* 2016, 1, 445-453.

[40]. Ma, W.; Ma, R. Z.; Wang, C. X.; Liang, J. B.; Liu, X. H.; Zhou, K. C.; Sasak, T. A Superlattice of Alternately Stacked Ni—Fe Hydroxide Nanosheets and Graphene for Efficient Splitting of Water. *ACS Nano* 2015, 9, 1977-1984.

[41]. Cui, X. J.; Ren, P. J.; Deng, D. H.; Deng, J.; Bao, X. H. Single layer graphene encapsulating non-precious metals as high-performance electrocatalysts for water oxidation. *Energy Environ. Sci.* 2016, 9, 123-129.

[42]. Park, H. S.; Leonard, K. C.; Bard, A. J. Surface Interrogation Scanning Electrochemical Microscopy (SI-SECM) of Photoelectrochemistry at a W/Mo—BiVO4 Semiconductor Electrode: Quantification of Hydroxyl Radicals during Water Oxidation. *J. Phys. Chem. C* 2013, 117, 12093-12102.

[43]. Qiu, Y.; Wang, Z.; Owens, A. C. E.; Kulaots, I.; Chen, Y.; Kane, A. B.; Hurt, R. H. Antioxidant Chemistry of Graphene-Based Materials and Its Role in Oxidation Protection Technology. *Nanoscale* 2015, 6, 11744-11755.

[44]. Song, C. H.; Pehrsson, P. E.; Zhao, W. Recoverable Solution Reaction of HiPco Carbon Nanotubes with Hydrogen Peroxide. *J. Phys. Chem. B* 2005, 109, 21634-21639.

[45]. Song, C. H.; Pehrsson, P. E.; Zhao, W. Optical Enzymatic Detection of Glucose Based on Hydrogen Peroxide-Sensitive HiPco Carbon Nanotubes. *J. Mater. Res.* 2006, 21, 2817-2823.

[46]. Tu, X. M.; Pehrsson, P. E.; Zhao, W. Redox Reaction of DNA-Encased HiPco Carbon Nanotubes with Hydrogen Peroxide: A Near Infrared Optical Sensitivity and Kinetics Study. *J. Phys. Chem. C* 2007, 111, 17227-17231.

[47]. Xu, Y.; Pehrsson, P. E.; Chen, L. W.; Zhang, R.; Zhao, W. Double-Stranded DNA Single-Walled Carbon Nanotube Hybrids for Optical Hydrogen Peroxide and Glucose Sensing. *J. Phys. Chem. C* 2007, 111, 8638-8643.

[48]. Benedict, B.; Pehrsson, P. E.; Zhao, W. Optically Sensing Additional Sonication Effects on HiPco Nanotubes in Aerated Water. *J. Phys. Chem. B* 2005, 109, 7778-7780.

[49]. Dukovic, G.; White, B. E.; Zhou, Z.-Y.; Wang, F.; Jockusch, S.; Steigerwald, M. L.; Heinz, T. F.; Friesner, R. A.; Turro, N. J.; Brus, L. E. Reversible Surface Oxidation and Efficient Luminescence Quenching in Semiconductor Single-Wall Carbon Nanotubes. *J. Am. Chem. Soc.* 2004, 126, 15269-15276.

[50]. Trasatti, S. *Electrodes of Conductive Metallic Oxides*. Elsevier: New York, 1981.

[51]. Lim, C. S.; Chua, C. K.; Sofer, Z.; Klimova, K.; Boothroyd, C.; Pumera, M. Layered transition metal oxyhydroxides as tri-functional electrocatalysts. *J. Mater. Chem. A* 2015, 3, 11920-11929.

[52]. Qiu, Y.; Xin, L.; Li, W. Electrocatalytic oxygen evolution over supported small amorphous Ni—Fe nanoparticles in alkaline electrolyte. *Langmuir: the ACS journal of surfaces and colloids* 2014, 30, 7893-7901.

What is claimed is:

1. A method of synthesizing a three-dimensional (3D) reduced graphene oxide (RGO) foam embedded with nanocatalysts, comprising:
    providing at least one solution containing at least one precursor of nanocatalysts, and a graphene oxide (GO) aqueous suspension; wherein the at least one solution comprises a first solution containing nickel (II) nitrate, and a second solution containing iron (III) nitrate, and the first and second solution are formed by dissolving $Ni(NO_3)_2 \cdot 6H_2O$ and $Fe(NO_3)_3 \cdot 9H_2O$ into deionized water respectively;
    mixing the GO aqueous suspension with the at least one solution to form a mixture suspension wherein the mixture suspension is characterized with pH=3.5 and a molar ratio of C:Ni: Fe=14:1:0.33; and
    performing one-pot hydrothermal reaction in the mixture suspension at a given pH to form a 3D RGO foam embedded with the nanocatalysts
    wherein the 3D RGO foam embedded with the nanocatalysts comprises pores that are connected to each other to form an interconnected 3D porous network of RGO sheets on which the nanocatalysts are grown.

2. The method of claim 1, wherein the hydrothermal reaction in the mixture suspension is performed in a sealed autoclave for hydrothermal reaction at a predetermined temperature for a period of time.

3. The method of claim 2, wherein the predetermined temperature is in a ranges of about 160-200° C., and the period of time is in a range of about 7-11 h.

4. The method of claim 1, wherein the 3D RGO foam embedded with the nanocatalysts is the RGO—Ni—Fe foam.

5. The method of claim 4, further comprising freeze-drying the RGO—Ni—Fe foam under about 0.05 mbar vacuum at about −50° C.

6. The method of claim 1, further comprising, prior to performing hydrothermal reaction in the mixture suspension, ultrasonicating the mixture suspension to remove air bubbles that are trapped in the mixture suspension.

7. The method of claim 1, wherein pore sizes of the interconnected 3D porous network are in a range of sub-micrometers to several micrometers and pore walls include thin layers of stacked graphene sheets.

* * * * *